Dec. 19, 1950 — F. R. FOWLER — 2,534,963

NUTATION DAMPER FOR GYROSCOPES

Filed May 3, 1948

Inventor:
Francis R. Fowler,
by Claude W. Mott.
His Attorney.

Patented Dec. 19, 1950

2,534,963

UNITED STATES PATENT OFFICE 2,534,963

NUTATION DAMPER FOR GYROSCOPES

Francis R. Fowler, Ballston Lake, N. Y., assignor to General Electric Company, a corporation of New York Application May 3, 1948, Serial No. 24,800

8 Claims. (Cl. 74—5.5)

The present invention relates to stabilized gyroscopes, and, and more particularly, to apparatus for minimizing nutational oscillations of gyroscopic instruments.

Under the influence of gimbal and motor bearing friction or sizeable vibrational shocks encountered by a gyroscope, a gyro rotor spin axis which normally tends to maintain a given attitude in space may be caused to oscillate together with its gimbals such that the movements of the ends of the rotor shaft describe circular or elliptical paths. This nutational oscillation may be sustained by unavoidable friction appearing in a gyroscope and the effects may be sufficiently regenerative to create completely intolerable nutation.

While it is difficult to eliminate to a satisfactory extent the foregoing conditions from which nutational oscillations originate, it is possible, in accordance with the present invention, to introduce an absorptive or dampening system which degeneratively influences the gyro oscillations to minimize nutational motion. The desired nutation damping may be obtained by absorbing mechanical energy from a nutating gyro and dissipating such energy in a manner which will preclude regeneration of the oscillatory movements. Further, the nutation frequency of a gyro is proportional to the gyro rotor speed, and, by proportioning a nutation damper arrangement such that it will be tuned to resonate at a desired frequency, gyro nutation may be most effectively eliminated at the rotor speeds substantially corresponding to this frequency.

It is therefore one object of the present invention to provide means for effectively minimizing nutational oscillation of a gyro instrument by absorbing nutational energy therefrom and dissipating this energy such that it does not sustain gyro oscillations.

Another object of this invention is to provide stabilized gyroscopic instruments which are protected from errors arising from nutational motion.

Additionally it is an object to provide a tuned gyro nutation damping device having an inertia member flexibly coupled to a gyro element and vibratable with respect thereto.

The above and further objects and features of the subject invention will appear more fully from the following description taken in connection with the accompanying drawings, wherein.

Figure 1:
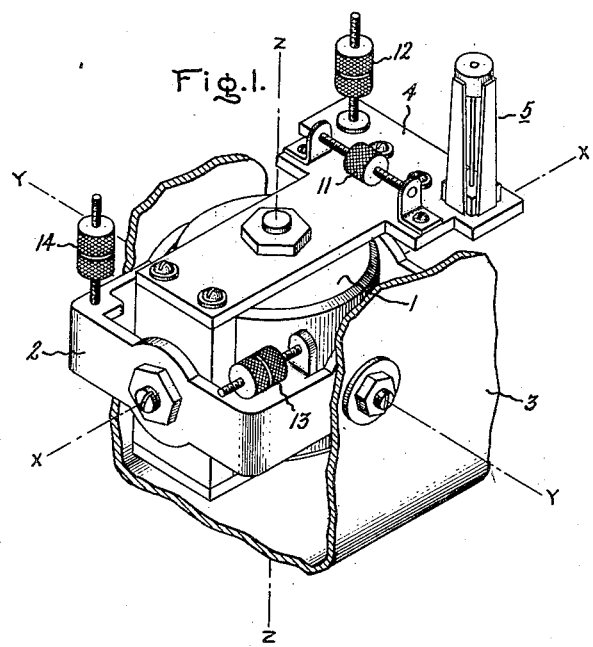
Figure 1 represents pictorially one form of gyroscopic instrument cooperating with a nutation damper and weight and torque compensating devices.

In the embodiment disclosed in Figure 1, a conventional gyroscopic instrument is represented by a rotor housing or frame 1 which serves as the rotor gimbal, a second gimbal 2 which is pivoted to frame 1 to permit rotation about axis X—X, and an outer gimbal or housing 3 pivoted to the second gimbal for rotation about axis Y—Y. Secured to the upper end of the rotor housing 1 is a supporting plate member 4 upon which the nutation damper assembly 5 is mounted such that its longitudinal axis is not coincident with the rotor spin axis Z—Z and does not intersect either of the gimbal pivot axes. In other arrangements, the damper axis may, of course, be colinear with the rotor spin axis and may intersect either or both pivot axes if desired.

Figure 2:
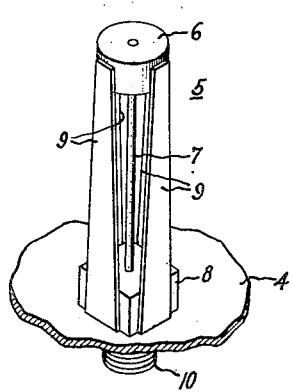
Figure 2 illustrates pictorially the detailed structure of the nutation damper arrangement of Figure 1.

One preferred construction of the damper assembly 5 is illustrated in greater detail in Figure 2 as comprising an inertia member or weight 6 having a cylindrical configuration, a flexible wire or spring member 7 rigidly attached at one end to weight 6, a four-sided support member 8 connected to the other end of wire 7, and four resilient retainer leafs 9 each attached at one end to one of the sides of the support member 8 and disposed such that their free ends bear lightly against the cylindrical weight 6. The lower end of the support member is shown threaded at 10 and may cooperate with a nut, not visible, to fasten the entire assembly to the plate 4.

When nutational oscillations commence, the rotor of the gyroscope is caused to depart from its normal spin axis Z—Z and, with its gimbals, moves such that the rotor ends describes circular or elliptical paths. This nutational motion of the rotor and its frame imparts a vibratory motion to the nutation damper assembly mounted on the frame, and this process involves the transfer of mechanical energy of the nutating rotor and frame to the damper assembly. Weight 6 and the straight flexible wire 7 form an energy-absorbing vibratory unit wherein the vibratory motion is substantially transverse to the normal longitudinal axis of the weight and spring. Further, the resilient retainer leaf springs 9 are in light frictional enagement with the weight 6 and serve to dissipate vibrational energy derived from the gyro nutation.

Optimum nutation damping obtains when the weight and spring unit is designed such that its natural frequency of vibration is very close to that of the nutation frequency of the gyro at a particular angular velocity of the rotor. It may be of advantage in certain instances to permit adjustment of the vibrational resonance, or resonant frequency, of the damper assembly, in which case the weight may be made adjustable for positioning along the spring to the proper location and for fastening thereto by any convenient means. The nutation damper of this invention may, however, be effective over a broad range of nutation frequencies about a particular frequency. Figure 1 also illustrates representative torque and weight balancing networks which may find utility if the gimbal pivot points are not chosen to compensate for the unbalance conditions produced by the nutation damper. Horizontally-adjustable weight 11 and vertically-adjustable weight 12 mounted on plate 4 may, for example, be utilized to balance the torques and weights of the rotor frame and damper about the gimbal axis X—X, and horizontally-adjustable weight 13 and vertically-adjustable weight 14 may be employed to balance the previously-mentioned combination and the gimbal 2 about the axis Y—Y. It should be apparent that other means may be devised to provide a balanced system or that in certain applications unbalances may be tolerated without compensation therefor.

Figure 3:
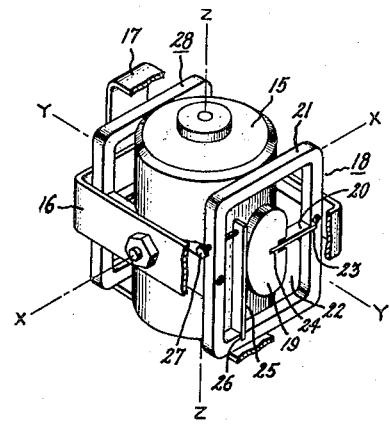
Figure 3 is a pictorial view of another embodiment of the gyro and nutation damper constructed in accordance with this invention.

Another embodiment of the present invention appears in Figure 3, wherein a nutation damper assembly is attached to at least one side of a gyro rotor frame. The gyro rotor frame identified by numeral 15 serves as an inner gimbal and permits rotation of the rotor about the spin axis Z—Z. For purposes of clarity in the illustration of the damper assembly, a second gimbal 16 and an outer gimbal member 17 are only partially shown. Nutational oscillations are suppressed in this gyro unit by the damper assembly designated by numeral 18. In this assembly, the inertia member 19 is attached to one end of a flexible flat spring member 20 which is fastened to the supporting plate 21. This supporting plate has an opening 22 therein which is dimensioned such that the inertia member 19 may be contained within and have freedom for vibratory motion within the volume of the opening. As illustrated, flexible member 20 is also contained within the plate opening and is rigidly fixed to the plate and inertia member at 23 and 24 respectively by any convenient method such as soldering or welding.

In the damper assembly of Figure 3, the frictional means bearing against the inertia member 19 comprises a flat spring 25 attached at one end to the plate 21 at 26 and also substantially contained within the opening 22. An adjusting screw 27 engaging a threaded hole in plate 21 and bearing against the free end of spring 25 may be included to permit adjustment of the magnitude of the friction between spring 25 and inertia member 19.

When nutational oscillation commences, the mechanical energy imparted to the rotor and frame thereby is translated to the inertia member through the spring member 20. The inertia member and spring are proportioned such that the resonant frequency of the combination is substantially the frequency of nutational oscillation when the rotor speed is a particular value, for example, but not necessarily, the normal operating speed of the rotor. The vibrational energy of the damper is dissipated rapidly by the friction developed between the inertia member and the adjustable leaf spring 25. Hence the ready absorption of nutational energy by a tuned system which immediately dissipates such energy results in minimized gyro nutation.

The orientation of a nutation damper assembly of this invention is preferably such that, when nutational oscillations of the gyro instrument occur, the component of translational velocity which appears at the center of gravity of the inertia member is as large as possible and parallel to a direction in which the member is free to vibrate.

It should be clear that more than one damper assembly may be associated with a gyro instrument and that, for example, side 28 of the gyro illustrated in Figure 3, or any other suitable section of the gyro, may be similar in construction to the nutation damper assembly at 18. Additionally, although for purposes of illustration the damper assemblies have been shown and described in connection with particular gyro structures and in certain positions, this invention should not be considered to be limited thereto. It may be desirable in some applications to apply several nutation damper assemblies to a gyroscope, other torque and weight balancing arrangements might be employed or, if a plurality of dampers are used, the nutation dampers themselves may be symmetrically disposed to eliminate unbalanced conditions, and there are numerous configurations of gyro instruments and nutation dampers which may be utilized and which will be in accord with the present invention.

It is obvious, therefore, that there are many modifications which may be made in the above-described embodiments by those skilled in the art without departure either in spirit or scope from the present invention. Hence, it is intended that all matter contained in the foregoing description or shown in the accompanying drawings shall be interpreted as illustrative and not in a limiting sense.

What I claim as new and desire to secure by Letters Patent of the United States is:

1. In a gyro apparatus wherein the gyro gimbal structures may move such that the rotor shaft may oscillate with respect to a predetermined attitude, the oscillation damping arrangement comprising an inertia member, flexible means rigidly coupling said inertia member with one of said gimbal structures for support thereby and for vibration with respect thereto, said flexible means and said inertia member being proportioned such that the natural period of vibration thereof occurs when said one of said gimbal structures has a predetermined frequency of motion, and means cooperating with one of said gimbal structures and said inertia member for dissipating vibrational energy of said inertia member.

2. A gyro apparatus comprising a gyro rotor, a gyro suspension system for said rotor, an inertia member, means flexibly connecting said member directly with said suspension system, and adjustable means coupled with said suspension system and disposed for variable frictional contact with said inertia member.

3. A gyro apparatus comprising a gyro rotor assembly, gyro suspension system for said assembly, and at least one nutation damper assembly including an inertia member, a flexible member rigidly coupled with said rotor assembly and said inertia member such that said flexible member and said inertia member form a unit which may vibrate with respect to said rotor assembly and which is tuned to vibrate at a predetermined frequency, and at least one resilient member coupled to said rotor assembly and disposed for frictional contact with said inertia member.

4. In a gyro apparatus wherein a gyro rotor assembly is suspended within a gimbal suspension system, at least one arrangement for damping nutational oscillations comprising an inertia member, a flexible member connected at one end to said inertia member and coupled with said rotor assembly at the opposite end, said flexible member and inertia member comprising a vibratory system and being disposed to vibrate as a unit substantially transversely to the spin axis of the gyro rotor, and resilient means coupled with said rotor assembly and disposed to frictionally contact said inertia member for dissipating the vibratory energy of said vibratory system.

5. In a gyro apparatus wherein a gyro rotor assembly is suspended within a gimbal suspension system, at least one arrangement for damping nutational oscillations comprising an inertia member, a flexible member connected at one end to said inertia member and coupled with said rotor assembly at the opposite end, said flexible member and inertia member comprising a vibratory system and being disposed to vibrate as a unit substantially transversely to the spin axis of said gyro rotor when nutational oscillation thereof occurs, said inertia member and flexible member being proportioned such that said vibratory system is resonant when nutational oscillation occurs at substantially a predetermined frequency, and resilient means coupled with said rotor assembly and disposed to frictionally contact said inertia member for dissipating the vibratory energy of said vibratory system.

6. A gyro apparatus comprising a gyro rotor assembly, a gimbal suspension system for said assembly, a weight, a linear flexible member connected at one end to said weight and connected with said assembly at the opposite end, said weight and flexible member comprising a vibratable system and being disposed such that the longitudinal axis of said flexible member is substantially parallel to the gyro rotor spin axis, said weight and flexible member being proportioned such that said vibratable system is resonant when nutational oscillations of said assembly occur at substantially a predetermined frequency, and resilient means connected with said rotor assembly and disposed for frictional contact with said weight.

7. A gyro apparatus including a gyro rotor frame, a gimbal suspension system for said rotor frame, at least one arrangement for damping nutational oscillations comprising a support member attached to said frame, a weight, a flexible member coupled at one end to said support member and to said weight at the opposite end, a plurality of spring members coupled at one end to said support member and having opposite ends thereof disposed for frictional engagement with said weight, said flexible member and said weight and said spring members forming a system which may vibrate with respect to said frame and which is proportioned such that vibrational resonance occurs at a predetermined frequency of nutational oscillation of said gyro rotor, and means associated with said gyro rotor frame and suspension system for compensating unbalance conditions produced by said support member and vibratable system.

8. A gyro apparatus including a gyro rotor frame, a gimbal suspension system for said rotor frame, at least one arrangement for damping nutational oscillations comprising a support member attached to said frame and having an opening therein, a weight, a flexible member coupled to said support member and to said weight, and adjustable resilient means coupled to said support member and disposed for variable frictional engagement with said weight, said weight and flexible member forming a system which may vibrate with respect to said support member and which is proportioned such that vibrational resonance occurs at a predetermined frequency of nutational oscillation of said gyro rotor, and which is at least partially contained within said opening in said support member.

FRANCIS R. FOWLER.

REFERENCES CITED

The following references are of record in the file of this patent:

UNITED STATES PATENTS

| Number | Name | Date |
|---|---|---|
| 1,716,284 | Risley | June 4, 1929 |
| 2,078,734 | Schilovsky | Apr. 27, 1937 |
| 2,246,738 | Lauck | June 24, 1941 |
| 2,411,550 | Lynn et al. | Nov. 26, 1946 |

FOREIGN PATENTS

| Number | Country | Date |
|---|---|---|
| 3318 of 1915 | Great Britain | Mar. 6, 1919 |